United States Patent
Hyun

(10) Patent No.: US 10,358,132 B2
(45) Date of Patent: Jul. 23, 2019

(54) AUTONOMOUS DRIVING METHOD AND APPARATUS

(71) Applicant: Samsung Electronics Co., Ltd., Suwon-si (KR)

(72) Inventor: Yoonsuk Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 15/490,167

(22) Filed: Apr. 18, 2017

(65) Prior Publication Data

US 2018/0057003 A1    Mar. 1, 2018

(30) Foreign Application Priority Data

Sep. 1, 2016   (KR) .......................... 10-2016-0112454

(51) Int. Cl.
| | |
|---|---|
| *B60W 30/16* | (2012.01) |
| *B60W 30/09* | (2012.01) |
| *B60W 40/04* | (2006.01) |
| *B60W 40/076* | (2012.01) |
| *B60W 50/00* | (2006.01) |
| *B60W 40/06* | (2012.01) |

(52) U.S. Cl.
CPC .......... *B60W 30/162* (2013.01); *B60W 40/06* (2013.01); *B60W 50/0097* (2013.01); *B60W 30/09* (2013.01); *B60W 2420/42* (2013.01); *B60W 2550/142* (2013.01); *B60W 2550/30* (2013.01); *B60W 2550/302* (2013.01); *B60W 2550/308* (2013.01); *B60W 2600/00* (2013.01); *B60W 2720/10* (2013.01); *B60W 2750/308* (2013.01)

(58) Field of Classification Search
CPC ............. B60W 50/0097; B60W 40/06; B60W 30/162; B60W 2550/30; B60W 2720/10; B60W 2600/00; B60W 2420/42; B60W 2550/142; B60W 2550/308; B60W 2550/302; B60W 2750/308; B60W 30/09
See application file for complete search history.

(56) References Cited

U.S. PATENT DOCUMENTS

| | | | |
|---|---|---|---|
| 2005/0033517 A1* | 2/2005 | Kondoh | ............... B60K 26/021 |
| | | | 701/301 |
| 2013/0158829 A1* | 6/2013 | Schumann | ............. B60K 31/00 |
| | | | 701/93 |
| 2016/0121888 A1 | 5/2016 | Choi | |
| 2016/0121891 A1* | 5/2016 | Kim | ...................... B60W 30/18 |
| | | | 701/96 |

FOREIGN PATENT DOCUMENTS

| | | |
|---|---|---|
| JP | 2004-325777 A | 11/2004 |
| JP | 2009-6889 A | 1/2009 |
| KR | 10-2014-0024771 A | 3/2014 |
| KR | 10-2015-0047215 A | 5/2015 |
| KR | 10-1529156 B1 | 6/2015 |
| KR | 10-2016-0061640 A | 6/2016 |

* cited by examiner

*Primary Examiner* — Mussa A Shaawat
(74) *Attorney, Agent, or Firm* — Sughrue Mion, PLLC

(57) ABSTRACT

An autonomous driving method includes: recognizing a target vehicle; determining a first slope of a host vehicle and a second slope of the target vehicle; correcting a result of the recognizing of the target vehicle based on the first slope and the second slope; and controlling the host vehicle based on the corrected result of the recognizing of the target vehicle.

26 Claims, 6 Drawing Sheets

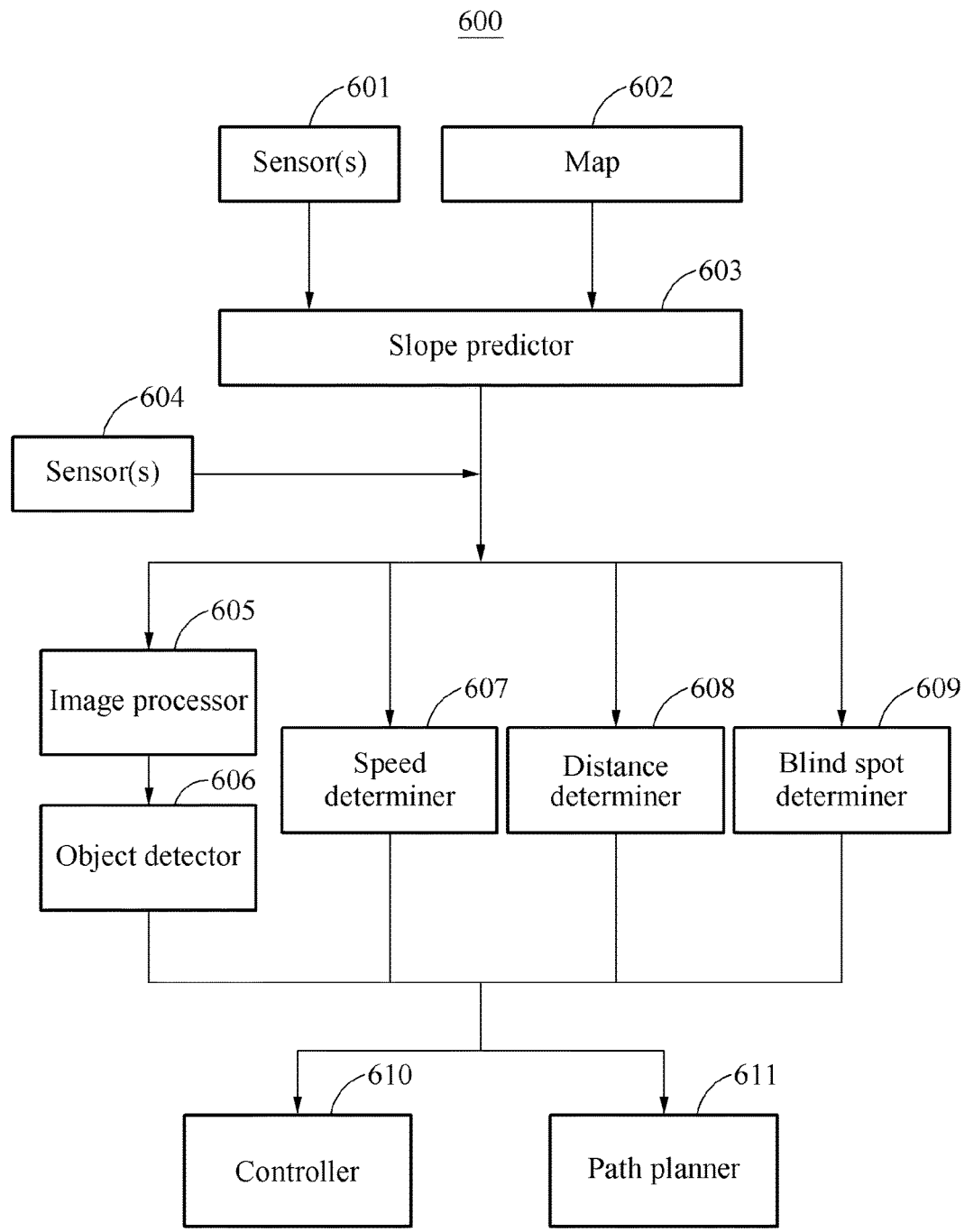

AUTONOMOUS DRIVING METHOD AND APPARATUS

CROSS-REFERENCE TO RELATED APPLICATIONS

This application claims the benefit under 35 USC § 119(a) of Korean Patent Application No. 10-2016-0112454 filed on Sep. 1, 2016, in the Korean Intellectual Property Office, the entire disclosure of which is incorporated herein by reference for all purposes.

BACKGROUND

1. Field

The following description relates to a method and apparatus for controlling an autonomous vehicle.

2. Description of Related Art

A human can recognize an uphill road portion, a downhill road portion, or a point at which a slope changes instantly when driving a vehicle on a road having varying slope. A vehicle to which autonomous driving technology is applied controls a driving path in view of a route to a destination and a sensed nearby vehicle or object. However, for many autonomous vehicles, driving algorithms are designed on the assumption that the vehicles are driven on an even ground. Thus, an autonomous vehicle to be driven on an uneven road needs to suitably prepare for changes in the slope of the road to set a path or control a speed. For more safe and accurate autonomous driving, technology that controls an autonomous vehicle by reflecting a slope of the vehicle or road is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an autonomous driving method includes: recognizing a target vehicle; determining a first slope of a host vehicle and a second slope of the target vehicle; correcting a result of the recognizing of the target vehicle based on the first slope and the second slope; and controlling the host vehicle based on the corrected result of the recognizing of the target vehicle.

The recognizing of the target vehicle may include recognizing any one or any combination of any two or more of: a distance between the host vehicle and the target vehicle; a speed of the target vehicle relative to the host vehicle; and a shape of the target vehicle.

The correcting of the result of the recognizing of the target vehicle may include correcting the shape of the target vehicle to a shape corresponding to the first slope based on a difference between the first slope and the second slope.

The correcting of the result of the recognizing of the target vehicle may include correcting the speed of the target vehicle relative to the host vehicle to a relative speed of a component corresponding to the second slope based on a difference between the first slope and the second slope.

The correcting of the result of the recognizing of the target vehicle may include correcting the distance to a ground distance between the host vehicle and the target vehicle based on a difference between the first slope and the second slope.

The correcting of the distance to the ground distance may include, in response to the host vehicle being located on a first ground portion and the target vehicle being located on a second ground portion: detecting an inflection point between the first ground portion and the second ground portion based on the first slope and the second slope; calculating a first distance on the first ground portion, between a point at which the host vehicle is located and the inflection point; calculating a second distance on the second ground portion, between the inflection point and a point at which the target vehicle is located; and calculating the ground distance based on the first distance and the second distance.

The determining of the first slope of the host vehicle and the second slope of the target vehicle may include either one or both of: in response to the host vehicle being located on a first ground portion and the target vehicle being located on a second ground portion, calculating the first slope based on altitudes of first front and rear points spaced apart at defined distances from a point at which the host vehicle is located, and a distance between the first front and rear points, on the first ground portion; and, in response to the host vehicle being located on the first ground portion and the target vehicle being located on the second ground portion, calculating the second slope based on altitudes of second front and rear points spaced apart at defined distances from a point at which the target vehicle is located, and a distance between the second front and rear points, on the second ground portion.

The determining of the first slope of the host vehicle and the second slope of the target vehicle may include: determining the first slope using a sensor of the host vehicle; calculating a slope difference between the host vehicle and the target vehicle based on the first slope and an image of the target vehicle; and calculating the second slope based on the slope difference.

The determining of the first slope of the host vehicle and the second slope of the target vehicle may include: acquiring a vehicle image corresponding to a defined slope; calculating a slope difference from the defined slope by comparing an image of the target vehicle to the vehicle image; and calculating the second slope based on the slope difference.

The determining of the first slope of the host vehicle and the second slope of the target vehicle may include: acquiring a three-dimensional (3D) vehicle image corresponding to a defined slope; calculating a slope difference from the defined slope by comparing an image of the target vehicle acquired using a stereo camera to the 3D vehicle image; and calculating the second slope based on the slope difference.

The controlling of the host vehicle may include: determining a risk of the target vehicle based on the corrected result of the recognizing of the target vehicle; adjusting a speed of the host vehicle based on the risk; and changing lanes of the host vehicle based on the risk and a lane of the target vehicle.

A non-transitory computer-readable storage medium may store instructions that, when executed by a processor, cause the processor to perform the method.

In another general aspect, an autonomous driving method includes: determining a first slope of a host vehicle and a second slope of a front road portion on which the host vehicle is to be driven; predicting a blind spot based on the first slope and the second slope; and controlling the host vehicle based on the blind spot.

The predicting of the blind spot may include determining the blind spot to be a space out of a longitudinal angle of view of a camera, based on a height of the camera from a ground on which the host vehicle is located, the longitudinal angle of view of the camera, and a difference between the first slope and the second slope.

The controlling of the host vehicle may include reducing a speed of the host vehicle in response to a distance between the host vehicle and the blind spot being less than a defined distance.

The controlling of the host vehicle may include reducing a sensing interval of a sensor of the host vehicle in response to a distance between the host vehicle and the blind spot being less than a defined distance.

The controlling of the host vehicle may include: predicting a path of a target vehicle in the blind spot in response to the target vehicle being located between the host vehicle and the blind spot; and controlling the host vehicle based on the predicted path of the target vehicle in response to the target vehicle being out of the longitudinal angle of view.

In another general aspect, an autonomous driving apparatus includes a processor configured to recognize a target vehicle, determine a first slope of a host vehicle and a second slope of the target vehicle, correct a result of the recognizing of the target vehicle based on the first slope and the second slope, and control the host vehicle based on the corrected result of the recognizing of the target vehicle.

The processor may be further configured to recognize any one or any combination of any two or more of: a distance between the host vehicle and the target vehicle; a speed of the target vehicle relative to the host vehicle; and a shape of the target vehicle.

The processor may be further configured to determine a third slope of a front road portion on which the host vehicle is to be driven, predict a blind spot based on the first slope and the third slope, and control the host vehicle based on the blind spot.

In another general aspect, an autonomous vehicle includes: a processor configured to determine a first slope of the autonomous vehicle and a second slope of a front road portion on which the autonomous vehicle is to be driven, predict a blind spot based on the first slope and the second slope, and control driving of the autonomous vehicle based on the blind spot.

The processor may be further configured to predict the blind spot by determining the blind spot to be a space out of a longitudinal angle of view of a camera.

The processor may be further configured to determine the blind spot to be the space out of the longitudinal angle of view of the camera based on a height of the camera from a ground on which the autonomous vehicle is located, the longitudinal angle of view of the camera, and a difference between the first slope and the second slope.

The controlling of the driving of the autonomous vehicle may include any one or any combination of any two or more of increasing of a reaction speed of the autonomous vehicle, reducing of a travelling speed of the autonomous vehicle, and reducing a sensing interval of a sensor of the autonomous vehicle, in response to determining that the autonomous vehicle is entering the blind spot.

The autonomous vehicle may further include a memory storing instructions that, when executed by the processor, cause the processor to perform the determining, the predicting, and the controlling.

The autonomous vehicle may be one of an automobile, a motorcycle and a drone.

Other features and aspects will be apparent from the following detailed description, the drawings, and the claims.

BRIEF DESCRIPTION OF THE DRAWINGS

FIG. 6 is a block diagram illustrating an example of an autonomous driving apparatus, according to an embodiment.

Figure 1:
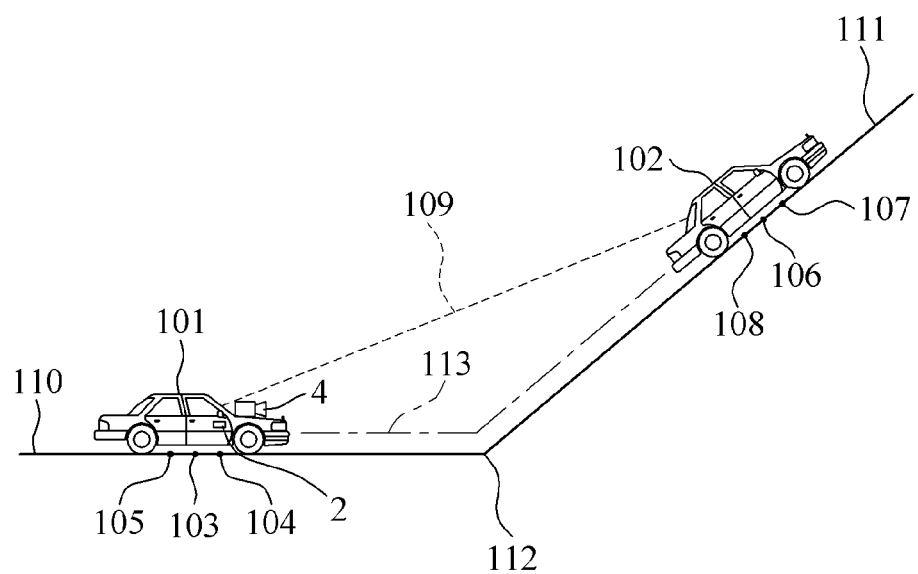
FIG. 1 illustrates an example of an autonomous driving method, according to an embodiment.

Throughout the drawings and the detailed description, unless otherwise described or provided, the same reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of an autonomous driving method performed using an autonomous driving apparatus 2, according to an embodiment. The autonomous driving apparatus 2 is, for example, an apparatus that collects, processes, stores, or transmits data or instructions associated with autonomous driving of a host vehicle, or autonomous vehicle 101, or controls the autonomous driving, and may be implemented as software modules, hardware modules, or various combinations thereof. The autonomous driving apparatus 2 may be mounted on the host vehicle 101, or may be disposed outside of the host vehicle 101 to remotely control the host vehicle 101. The host vehicle 101, may be an automobile (e.g., a car or a truck) or a motorcycle, including an engine and/or motor, and wheels for driving on a ground surface. Alternatively, the host vehicle 101 may be a drone, or an unmanned vehicle.

Referring to FIG. 1, the host vehicle 101 is performing autonomous driving using the autonomous driving apparatus 2, and the autonomous driving apparatus 2 senses vehicles near the host vehicle 101. The host vehicle 101 is a vehicle to be controlled by the autonomous driving apparatus 2. The vehicles near the host vehicle 101 are vehicles located in a vicinity of the host vehicle, for example, vehicles located within a range defined based on a location of the host vehicle.

At least one sensor or camera 4 of the host vehicle 101 senses the vehicles near the host vehicle 101, for example, vehicles located ahead, behind, and on both sides of the host vehicle 101. The autonomous driving apparatus 2 recognizes the nearby vehicles based on data collected from the sensor or camera 4 and stores a recognition result obtained from the recognizing of the nearby vehicles. The autonomous driving apparatus identifies the nearby vehicles based on the data collected from the sensor or camera 4, and tracks and stores speeds of the nearby vehicles, distances from the host vehicle 101, a distance between the nearby vehicles, and current lanes of the nearby vehicles.

The autonomous driving apparatus controls driving of the host vehicle 101 based on a slope of the host vehicle 101 and a slope of a target vehicle 102, among the nearby vehicles. The slope of the vehicle 101/102 is the angle at which the vehicle 101/102 is disposed, or slopes, on a ground or road. The target vehicle 102 is a vehicle targeted for slope measurement or recognition, for example, a vehicle located on a front road portion or front ground portion 111, on which the host vehicle 101 is to be driven, which is disposed ahead of a road portion or ground portion 110 on which the host vehicle 101 is located. In response to the slope of the host vehicle 101 differing from the slope of the target vehicle 102, the autonomous driving apparatus 2 corrects a result of recognizing the target vehicle 102, and reflects the corrected result of recognizing in driving of the host vehicle 101. In response to the host vehicle 101 being driven on a road with inflection, the autonomous driving apparatus 2 determines the slope of the host vehicle 101 and the slope of the target vehicle 102, reflects the slopes in a recognition algorithm that recognizes an object near the host vehicle 101, for example, the target vehicle 102, and reflects the slopes to generate a path of the host vehicle 101 or adjust a speed of the host vehicle 101. Through this process, the autonomous driving apparatus 2 controls the host vehicle 101 to be driven safely and precisely although unexpected situations may occur on a road with a varying slope. Hereinafter, an operating method of the autonomous driving apparatus 2 will be described with reference to FIG. 2.

Figure 2:
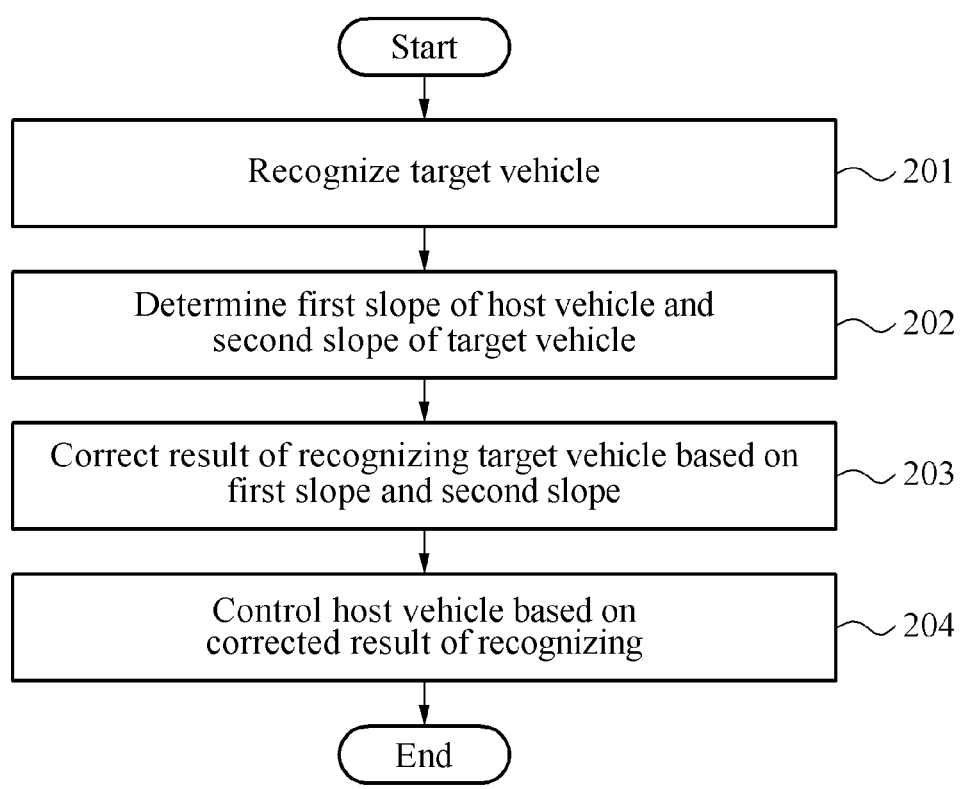
FIG. 2 is a flowchart illustrating an example of an autonomous driving method, according to an embodiment.

FIG. 2 is a flowchart illustrating an example of an autonomous driving method, according to an embodiment.

Referring to FIG. 2, in operation 201, the autonomous driving apparatus 2 recognizes the target vehicle 102. The autonomous driving apparatus 2 analyzes characteristics related to the target vehicle 102 based on data obtained from the sensor or camera 4 of the host vehicle 101, data collected from the target vehicle 102 using short range communication, and data obtained from a memory of the host vehicle 101 or an external server. The server is, for example, a server implemented in a form of an open cloud that is corrected and edited in freedom or a cloud for which an access authority is restricted.

Among the characteristics related to the target vehicle 102, the autonomous driving apparatus 2 recognizes a distance between the host vehicle 101 and the target vehicle 102. For example, the autonomous driving apparatus 2 senses a position of the target vehicle 102 relative to the host vehicle 101 using the sensor or camera 4 of the host vehicle 101. The autonomous driving apparatus 2 recognizes the distance between the host vehicle 101 and the target vehicle 102 based on the sensed position of the target vehicle 102 relative to the host vehicle 101.

Among the characteristics related to the target vehicle 102, the autonomous driving apparatus 2 recognizes a speed of the target vehicle 102 relative to the host vehicle 101. For example, the autonomous driving apparatus 2 senses a speed of the host vehicle 101 and a speed of the target vehicle 102 using the sensor or camera 4. The autonomous driving apparatus 2 recognizes the speed of the target vehicle 102 relative to the host vehicle 101 based on the sensed speed of the host vehicle 101 and the sensed speed of the target vehicle 102.

Among the characteristics related to the target vehicle 102, the autonomous driving apparatus 2 recognizes a shape of the target vehicle 102. For example, the autonomous driving apparatus 2 acquires an image of the target vehicle 102 using the sensor or camera of the host vehicle 101, and recognizes the shape of the target vehicle 102 based on the acquired image. The shape of the target vehicle 102 is, for example, the shape of an exterior of the target vehicle 102 that may be visually recognized, and includes, for example, an overall appearance of the target vehicle 102, and an appearance of a part such as a headlight, a side-view mirror, a windshield wiper, or a tire of the target vehicle 102. The overall appearance of the target vehicle 102 includes a contour or a color of the target vehicle 102.

In operation 202, the autonomous driving apparatus 2 determines a first slope, which is a slope of the host vehicle 101, and a slope, which is a slope of the target vehicle 102. As can be seen in FIG. 1, the first slope is an angle at which the host vehicle 101 slopes on a predetermined ground, for example, an angle at which the host vehicle 101 slopes on the first ground portion 110 in response to the host vehicle 101 being located on the first ground portion 110. The second slope is an angle at which the target vehicle 102 slopes on a predetermined ground, for example, an angle at which the target vehicle 102 slopes on the second ground portion 111 in response to the target vehicle 102 being located on the second ground portion 111. Further, a slope of a vehicle is estimated as a slope of a ground on which the vehicle is located, and defined as an angle at which the vehicle faces an upper or lower direction. The method of defining a slope may vary based on an intended operating design of the autonomous driving apparatus 2.

The autonomous driving apparatus 2 obtains a map from the server or memory, and determines the first slope and the second slope based on slopes reflected in the map. For example, the autonomous driving apparatus 2 obtains a location of the host vehicle 101 using a global positioning system (GPS) sensor of the host vehicle 101, and obtains the first slope from the map. The autonomous driving apparatus 2 senses the position of the target vehicle 102 relative to the host vehicle 101 using the sensor or camera 4, and obtains a location of the target vehicle 102 based on the sensed position of the target vehicle 102 relative to the host vehicle 101 and the location of the host vehicle 101. The autonomous driving apparatus 2 obtains the second slope of the target vehicle 102 from the map based on the location of the target vehicle 102.

The autonomous driving apparatus 2 determines the firsts slope and the second slope based on altitudes written on the map. For example, the autonomous driving apparatus 2 detects a point 103 at which the host vehicle 101 is located on the first ground portion 110. The autonomous driving apparatus 2 detects first front and rear points 104 and 105 spaced apart at defined or predefined distances from the point 103 on the first ground portion 110. The defined or predefined distance is a distance to be used to measure a slope, and may be set to be as small as possible to accurately measure a slope. The autonomous driving apparatus 2 obtains altitudes of the first front and rear points 104 and 105 from the map. The autonomous driving apparatus measures the first slope based on the altitudes of the first front and rear points 104 and 105 and a distance between the first front and rear points 104 and 105.

The autonomous driving apparatus 2 measures the second slope using a scheme that is similar to the aforementioned scheme used to measure the first slope. That is, the autonomous driving apparatus 2 detects a point 106 at which the target vehicle 102 is located on the second ground portion 111 based on the location of the target vehicle 102. The autonomous driving apparatus 2 detects second front and rear points 107 and 108 spaced apart at defined or predefined distances from the point 106 on the second ground portion 111, and obtains altitudes of the second front and rear points 107 and 108 from the map. The autonomous driving apparatus 2 measures the second slope based on the altitudes of the second front and rear points 107 and 108 and a distance between the second front and rear points 107 and 108.

The autonomous driving apparatus 2 measures a slope of the host vehicle 101 using a gyro sensor or inertial measurement unit (IMU) sensor of the host vehicle 101. The autonomous driving apparatus 2 determines the first slope by combing the slope of the host vehicle 101 obtained from the map and the slope of the host vehicle 101 measured through the gyro sensor or IMU sensor. The autonomous driving apparatus 2 obtains the second slope from the target vehicle 102 or the server. The target vehicle 102 determines the second slope using the scheme a gyro sensor or IMU sensor of the target vehicle 102, and transmits the second slope to the host vehicle 101 and the server through short range communication.

The autonomous driving apparatus 2 determines the second slope using an image of the target vehicle 102. For example, the autonomous driving apparatus calculates a slope difference between the host vehicle 101 and the target vehicle 102 based on the first slope and the image of the target vehicle 102. The autonomous driving apparatus 2 calculates the second slope based on the calculated slope difference and the first slope.

The autonomous driving apparatus 2 determines the second slope by comparing the image of the target vehicle 102 to a vehicle image corresponding to a defined or predefined slope. For example, the autonomous driving apparatus 2 acquires the vehicle image corresponding to the predefined slope from the server or memory, and compares the image of the target vehicle 102 to the acquired vehicle image. The autonomous driving apparatus 2 calculates a slope difference from the predefined slope based on a comparison result, and calculates the second slope based on the calculated slope difference and the predefined slope.

The autonomous driving apparatus determines the second slope using an image of the target vehicle 102 acquired through the camera 4, which is a stereo camera. Here, the image of the target vehicle 102 is a three-dimensional (3D) image. The autonomous driving apparatus 2 acquires a 3D vehicle image corresponding to the predefined slope from the server or memory. The autonomous driving apparatus 2 acquires the image of the target vehicle 102 using the stereo camera 4 of the host vehicle 101, and compares the acquired image of the target vehicle 102 to the 3D vehicle image corresponding to the predefined slope. The autonomous driving apparatus 2 calculates a slope difference from the predefined slope based on a comparison result. The autonomous driving apparatus 2 calculates the second slope based on the calculated slope difference and the predefined slope.

The autonomous driving apparatus 2 determines the second slope using a neural network trained based on vehicle images corresponding to slopes. The neural network is trained based on vehicle images to be used as training samples and labels of the vehicle images, and thus outputs a slope corresponding to an input vehicle image. Here, the labels are information used to identify the training samples, and indicate preferable output values, for example, slopes, required from the training samples, for example, the vehicle images. The autonomous driving apparatus 2 generates a feature vector from the image of the target vehicle 102, obtains an output vector by inputting the generated feature vector into the trained neural network, and determines the second slope from a slope represented by the output vector. The disclosure is not limited to the described scheme or technique of adopting a deep learning based algorithm for the autonomous driving apparatus 2 to measure the slope of the target vehicle 102. Various techniques may be applied. Further, the neural network may be trained using 3D images. In this example, the autonomous driving apparatus 2 acquires a 3D image of the target vehicle 102 using the stereo camera 4 of the host vehicle 101, and determines the second slope using the acquired 3D image.

In operation 203, the autonomous driving apparatus corrects a result of recognizing the target vehicle 102 based on the first slope and the second slope. If the autonomous driving apparatus 2 were to recognize the target vehicle 102 without considering a slope difference between the host vehicle 101 and the target vehicle 102, the autonomous driving apparatus 2 would recognize a distorted characteristic of the target vehicle 102 or would generate an incorrect determination result due to an error occurring during a recognition process. The autonomous driving apparatus 2 corrects a distorted characteristic of the target vehicle 102 or the recognition error based on the first slope and the second slope.

The autonomous driving apparatus 2 corrects the shape of the target vehicle 102 to a shape corresponding to the first slope based on a difference between the first slope and the second slope. In response to the difference between the first slope and the second slope being relatively great, the shape of the target vehicle 102 recognized by the autonomous driving apparatus 2 is distorted, and the distorted shape causes an error in recognizing the target vehicle 102. The autonomous driving apparatus 2 corrects the acquired image of the target vehicle 102 to correspond to the first slope based on the difference between the first slope and the second slope, and recognizes the shape of the target vehicle 102 corresponding to the first slope from the corrected image. The autonomous driving apparatus 2 recognizes an overall appearance of the target vehicle 102 or an appearance of a part of the target vehicle 102 based on the corrected shape, and applies the corrected shape to an algorithm that recognizes a vehicle.

The autonomous driving apparatus 2 corrects the speed of the target vehicle 102 relative to the host vehicle 101 to a relative speed of a component corresponding to the second slope based on the difference between the first slope and the second slope. The autonomous driving apparatus 2 senses the speed of the host vehicle 101 and the speed of the target vehicle 102, and recognizes the speed of the target vehicle 102 relative to the host vehicle 101. Since the target vehicle 102 is driven on the second ground portion 111, the autonomous driving apparatus 2 needs to correct the speed of the target vehicle 102 relative to the host vehicle 101 to a speed in a direction along the second ground portion 111. For example, since the host vehicle 101 is driven on the first ground portion 110, the autonomous driving apparatus 2 recognizes the speed of the target vehicle 102 relative to the host vehicle 101 in a direction along the first ground portion 110. The autonomous driving apparatus 2 calculates a speed component corresponding to the second slope, among relative speed components, based on the difference between the first slope and the second slope. The autonomous driving apparatus 2 corrects the speed of the target vehicle 102 relative to the host vehicle 101 to the relative speed of the component corresponding to the second slope based on a calculation result.

The autonomous driving apparatus 2 corrects a straight-line, diagonal distance 109 between the host vehicle 101 and the target vehicle 102 to a ground distance 113 between the host vehicle 101 and the target vehicle 102 based on the difference between the first slope and the second slope. Since the host vehicle 101 is driven on the ground, a distance between the host vehicle 101 and the target vehicle 102 needs to be calculated along the ground. In response to the first slope differing from the second slope, the autonomous driving apparatus 2 controls the host vehicle based on the ground distance 113 between the host vehicle 101 and the target vehicle 102, rather than the straight-line, diagonal distance 109 between the host vehicle 101 and the target vehicle 102. To calculate the ground distance 113, the autonomous driving apparatus utilizes an inflection point 112 between the first ground portion 110 and the second ground portion 111. For example, the autonomous driving apparatus 2 detects the inflection point 112 between the first ground portion 110 and the second ground portion 111 based on the first slope and the second slope. The autonomous driving apparatus 2 determines a point at which an instant rate of change of the slope changes sharply, among slopes on the ground, to be the inflection point 112. The autonomous driving apparatus 2 calculates a first distance between a point at which the host vehicle 101 is located and the inflection point 112, on the first ground portion 110. The autonomous driving apparatus 2 calculates a second distance between the inflection point 112 and a point at which the target vehicle 102 is located, on the second ground portion 111. The autonomous driving apparatus calculates the ground distance 113 by adding the first distance and the second distance. To determine a possibility of collision with the target vehicle 102 or the risk of the target vehicle 102, the autonomous driving apparatus 2 defines the point at which the host vehicle 101 is located as a point on the first ground portion 110 corresponding to a front side of the host vehicle 101, and defines the point at which the target vehicle 102 is located as a point on the second ground portion 111 corresponding to a rear side of the target vehicle 102. The autonomous driving apparatus 2 may apply the schemes described above to correct a result of recognizing a different type of object, in addition to the target vehicle 102, based on the measured slopes. Further, the autonomous driving apparatus 2 may apply the scheme described above to correct a result of recognizing nearby vehicles in other directions, in addition to a vehicle ahead of the host vehicle 101.

In operation 204, the autonomous driving apparatus 2 controls the host vehicle 101 based on the corrected results of recognizing the target vehicle 102. The autonomous driving apparatus 2 reflects the corrected result of recognizing in generating a path of the host vehicle 101, determining a driving direction of the host vehicle 101, changing lanes in which the host vehicle 101 operates, accelerating the host vehicle 101, or decelerating the host vehicle 101. For example, the autonomous driving apparatus 2 determines the risk of the target vehicle 102 based on the corrected result of recognizing the target vehicle 102, and adjusts the speed of the host vehicle 101 based on the risk or changes lanes of the host vehicle 101 based on the risk and a lane of the target vehicle 102. The autonomous driving apparatus 2 determines, based on the corrected result of recognizing the target vehicle 102: a case in which an average speed of the target vehicle 102 during a predefined time period is relatively high, sudden acceleration is performed a number of times, or sudden deceleration is performed a number of times; a case in which a distance between the target vehicle 102 and a vehicle ahead of the target vehicle 102 is relatively short; a case in which a number of lane changes are performed, a case in which a part is damaged or not installed suitably, (for example, the side-view mirrors are folded), a case in which there is a possibility of objects or goods falling from the target vehicle 102 due to an excessive amount of goods being loaded in comparison to a structure of the target vehicle 102; a case in which a number of dents are observed in the target vehicle 102; a case in which the target vehicle 102 is a model with a high accident rate according to historical statistics of past accident rates; and a case in which a production year of the target vehicle 102 is long time prior to the current date. The autonomous driving apparatus 2 calculates the risk of the target vehicle 102 by reflecting defined or predefined weights in determination results. The autonomous driving apparatus 2 controls the driving of the host vehicle 101 based on the risk of target vehicle 102, thereby safely preparing for a sudden accident that may be caused by the target vehicle 102.

Figure 3:
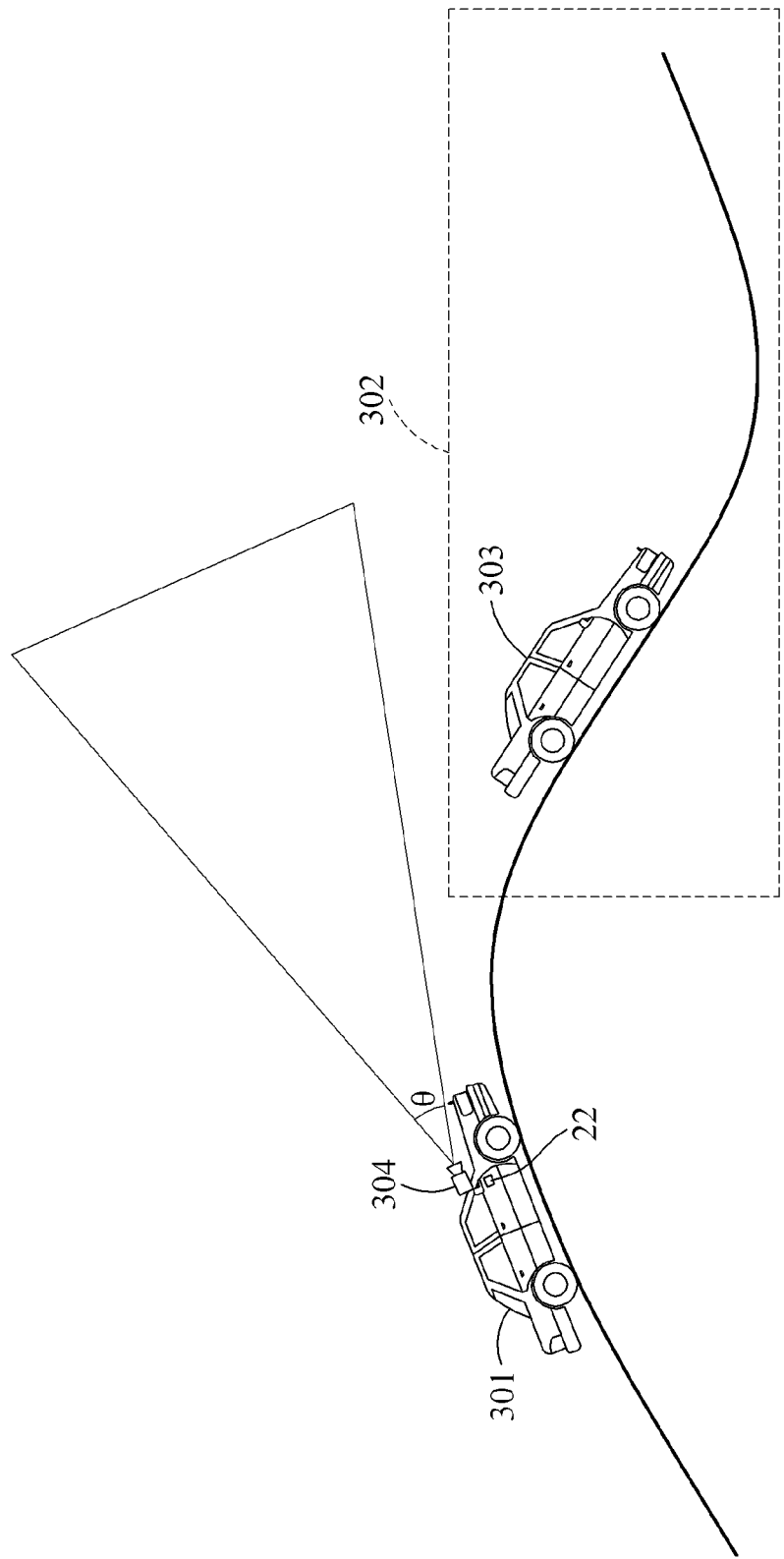
FIG. 3 illustrates an example of an autonomous driving method, according to an embodiment.

FIG. 3 illustrates an example of an autonomous driving method, according to an embodiment.

Referring to FIG. 3, an autonomous driving apparatus 22 recognizes a front road portion on which a host vehicle 301 (e.g., an automobile, a motorcycle, or a drone) is to be driven. The front road portion refers to a road portion ahead of the host vehicle 301, on which the host vehicle 301 is planned to be driven based on a path set by the autonomous driving apparatus 22. As shown in FIG. 3, the host vehicle 301 is being driven on an uneven road. In a case in which a slope of the road changes greatly, there may be a blind spot 302 which is a space out of a field of view of the host vehicle 301. "The expression "out of the field of view of the host vehicle 301" refers to a position out of an angle of view θ of a sensor or camera 304 of the host vehicle 301 that is used by the autonomous driving apparatus 2 to control a path and driving of the host vehicle 301. In a case in which an object or obstacle such as a target vehicle 303 appears suddenly in the blind spot 302, the autonomous driving apparatus 22 may have difficulties in avoiding a collision of the host vehicle 301. To avoid an unexpected situation that may occur in the blind spot 302, the autonomous driving apparatus 22 needs to predict the blind spot 302. In particular, although the change in the slope of the road is not great at a portion in which the slope of the front road portion increases and then decreases, for example, at a local maximum, there may be the blind spot 302. In this example, the autonomous driving apparatus 22 needs to accurately determine and handle a road portion corresponding to the blind spot 302. In response to the host vehicle 301 approaching the blind spot 302, the autonomous driving apparatus 22 increases a reaction speed of the host vehicle 301, or reduces a travelling speed of the host vehicle 301. The autonomous driving apparatus 22 predicts the blind spot 302 which is a space unobservable with the camera 304, based on a slope of the host vehicle 301 and specifications of the camera 304. Hereinafter, an operating method of the autonomous driving apparatus 22 will be described with reference to FIG. 4.

Figure 4:
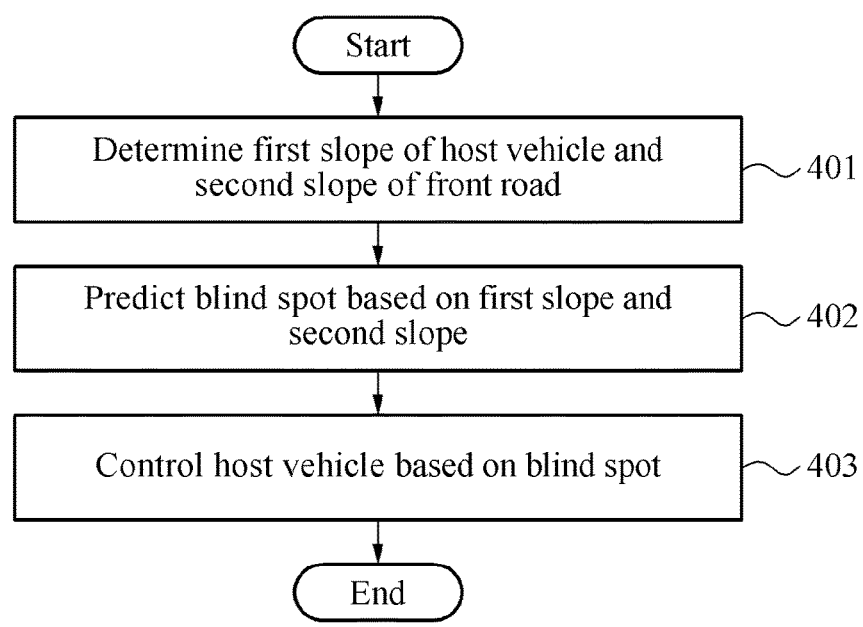
FIG. 4 is a flowchart illustrating an example of an autonomous driving method, according to an embodiment.

FIG. 4 is a flowchart illustrating an example of an autonomous driving method, according to an embodiment.

Referring to FIG. 4, in operation 401, the autonomous driving apparatus 22 determines a first slope, which is a slope of the host vehicle 301, and a second slope, which is a slope of a front road portion on which the host vehicle is to be driven. Thus, the second slope described with reference to FIG. 4 refers to a slope of the front road portion, rather than a slope of a target vehicle described with reference to FIGS. 1 and 2. The autonomous driving apparatus 22 calculates the first slope of the host vehicle 301 and the second slope of the front road portion using the scheme described with reference to FIG. 2. For example, the autonomous driving apparatus 22 obtains a map from a server or memory, and determines the first slope and the second slope based on slopes reflected in the map. The autonomous driving apparatus 22 senses a location of a point at which the second slope is to be measured, among points on the front road portion, and obtains the second slope from the map based on the sensed location. The autonomous driving apparatus 22 measures the second slope based on altitudes of front and rear points spaced apart at defined or predefined distances from the point at which the second slope is to be measured, among the points on the front road portion, and a distance between the front and rear points. To measure the slope of the front road portion, the schemes described with reference to FIG. 2 may apply. Thus, duplicated descriptions will be omitted for conciseness.

In operation 402, the autonomous driving apparatus 22 predicts the blind spot 302 based on the first slope and the second slope. The autonomous driving apparatus 22 predicts the blind spot 302 based on a height of the camera 304 from the ground portion on which the host vehicle 301 is located, a longitudinal angle of view θ of the camera 304, and a difference between the first slope and the second slope. The autonomous driving apparatus 22 measures slopes at points on the front road portion in advance of driving on the front road portion, calculates differences between the measured slopes and the first slope, predicts a space out of the longitudinal angle of view θ of the camera 304, and determines the predicted space to be the blind spot 302.

In operation 403, the autonomous driving apparatus 22 controls the host vehicle 301 based on the blind spot 302. In response to a distance between the host vehicle 301 and the blind spot 302 being less than a defined or predefined threshold distance, the autonomous driving apparatus 22 reduces a speed of the host vehicle 301 or reduces a sensing interval of a sensor of the host vehicle 301 to safely handle an unexpected situation that may occur in the blind spot 302. The autonomous driving apparatus 22 assumes that an obstacle is present in the blind spot 302, and reduces the speed of the host vehicle 301 to a speed sufficient to safely avoid a collision with the obstacle.

In response to the target vehicle 303 being present between the host vehicle 301 and the blind spot 302, the autonomous driving apparatus 22 predicts a path of the target vehicle 303 in the blind spot 302. In response to the target vehicle 303 being out of the longitudinal angle of view of the camera 304, the autonomous driving apparatus 22 controls the host vehicle 301 based on the predicted path of the target vehicle 303. For example, assume that a distance between the host vehicle 301 and the blind spot 302 is less than a defined or predefined threshold distance, and the autonomous driving apparatus senses the target vehicle 303 present between the host vehicle 301 and the blind spot 302. In this example, the autonomous driving apparatus 22 predicts and stores the path of the target vehicle 303 in the blind spot 302. In response to the target vehicle 303 entering the blind spot 302 and being out of the longitudinal angle of view of the camera 304, the autonomous driving apparatus 22 generates a path of the host vehicle 301 based on the stored path of the target vehicle 303, and adjusts the speed of the host vehicle 301. The autonomous driving apparatus recognizes blind spots defined on the front road portion and in other regions by applying the scheme described above. For example, a blind spot on another road portion or a rear road portion may be defined in advance, and the autonomous driving apparatus 22 may recognize the blind spot and control a host vehicle 301 in view of the blind spot.

Figure 5:
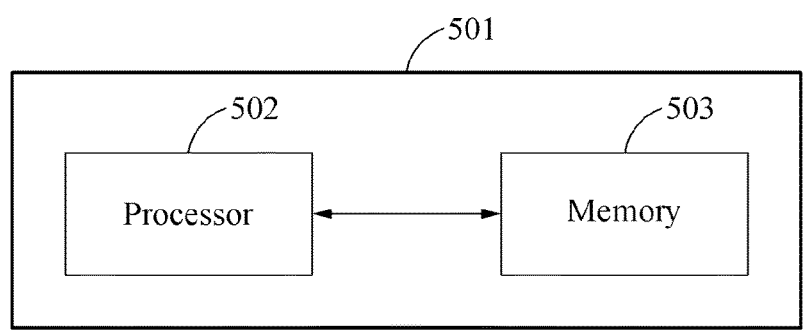
FIG. 5 is a block diagram illustrating an example of an autonomous driving apparatus, according to an embodiment.

FIG. 5 is a block diagram illustrating an example of an autonomous driving apparatus 501, according to an embodiment.

Referring to FIG. 5, the autonomous driving apparatus 501 includes a processor 502 and a memory 503. The memory 503 is configured to record programs configured to process instructions associated with autonomous driving, and record instructions to perform the operations described with reference to FIGS. 1 through 4. The memory 503 is configured to record data sensed from a sensor or camera of a host vehicle, and record data received from a server.

The processor 502 loads and executes the programs recorded in the memory 503. The processor 502 recognizes a target vehicle, corrects a result of recognizing the target vehicle based on a slope of the host vehicle and a slope of the target vehicle, and controls the host vehicle based on the corrected result of recognizing the target vehicle. Further, the processor 502 predicts a blind spot based on the slope of the host vehicle and a slope of a front road portion, and controls the host vehicle based on the blind spot. The examples described above apply to the operations of the processor 502, and thus duplicated descriptions will be omitted herein for conciseness.

FIG. 6 is a block diagram illustrating an example of an autonomous driving apparatus 600, according to an embodiment.

Referring to FIG. 6, the autonomous driving apparatus 600 includes a slope predictor 603, an image processor 605, an object detector 606, a speed determiner 607, a distance determiner 608, a blind spot determiner 609, a controller 610, and a path planner 611. The slope predictor 603 predicts a slope of a host vehicle, a slope of a target vehicle, and a slope of a front road portion based on data obtained from the sensor(s) 601 and a map 602. Here, the sensor(s) 601 includes any one or any combination of any two or more of a gyro sensor, an IMU sensor, a camera, a radio detection and ranging (RADAR), a light detection and ranging (LiDAR), a global positioning system (GPS), and other sensors. The map 602 is obtained from a server or memory. The slope predictor 603 obtains slopes and altitudes written on the map 602 based on a location of the host vehicle, a location of the target vehicle, and locations of points on the ground. The locations are obtained using, for example, a GPS positioning scheme using terminals equipped with GPS chip sets, a proximity scheme that approximates to a location of a cell base station to which a terminal belongs, a trigonometric positioning scheme using time of arrival/time difference of arrival (TOA/TDOA), or a proximity scheme that approximates to a location of a wireless fidelity access point (WiFi AP) connected in a wireless location area network (WLAN) environment. The image processor 605 corrects an image generated based on data obtained from sensor(s) 604 based on the slope of the host vehicle, the slope of the target vehicle, and the slope of the front road portion. Here, the sensor(s) 604 includes a gyro sensor, an IMU sensor, a camera, a RADAR, a LiDAR, a GPS, and other sensors. The object detector 606 detects an object from the image corrected by the image processor 605. The speed determiner 607 corrects a speed of the target vehicle relative to the host vehicle based on the data obtained from the sensor(s) 604, the slope of the host vehicle, and the slope of the target vehicle. The distance determiner 608 correct a distance between the host vehicle and the target vehicle to a ground distance based on the data obtained from the sensor(s) 604, the slope of the host vehicle, and the slope of the target vehicle. The blind spot determiner 609 determines a blind spot based on the slope of the host vehicle and the slope of the front road portion. The controller 610 controls the host vehicle based on recognition results generated by the object detector 606, the speed determiner 607, the distance determiner 608, and the blind spot determiner 609. The path planner 611 generates a path of the host vehicle based on the recognition results generated by the object detector 606, the speed determiner 607, the distance determiner 608, and the blind spot determiner 609.

The processor 502 and the memory 503 in FIG. 5, and the slope predictor 603, the image processor 605, the object detector 606, the speed determiner 607, the distance determiner 608, the blind spot determiner 609, the controller 610, and the path planner 611 in FIG. 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An autonomous driving method, comprising:
   recognizing a target vehicle;
   determining a first slope at which a host vehicle is traveling and a second slope at which the target vehicle is traveling, the second slope being different from the first slope;
   correcting a result of the recognizing of the target vehicle based on a difference between the first slope and the second slope; and
   controlling the host vehicle based on the corrected result of the recognizing of the target vehicle.

2. The autonomous driving method of claim 1, wherein the recognizing of the target vehicle comprises recognizing any one or any combination of any two or more of:
   a distance between the host vehicle and the target vehicle;
   a speed of the target vehicle relative to the host vehicle; and a shape of the target vehicle.

3. The autonomous driving method of claim 2, wherein the correcting of the result of the recognizing of the target vehicle comprises correcting the shape of the target vehicle to a shape corresponding to the first slope based on the difference between the first slope and the second slope.

4. The autonomous driving method of claim 2, wherein the correcting of the result of the recognizing of the target vehicle comprises correcting the speed of the target vehicle relative to the host vehicle to a relative speed of a component corresponding to the second slope based on the difference between the first slope and the second slope.

5. The autonomous driving method of claim 2, wherein the correcting of the result of the recognizing of the target vehicle comprises correcting the distance to a ground distance between the host vehicle and the target vehicle based on the difference between the first slope and the second slope.

6. The autonomous driving method of claim 5, wherein the correcting of the distance to the ground distance comprises, in response to the host vehicle being located on a first ground portion and the target vehicle being located on a second ground portion:
   detecting an inflection point between the first ground portion and the second ground portion based on the first slope and the second slope;
   calculating a first distance on the first ground portion, between a first point at which the host vehicle is located and the inflection point;
   calculating a second distance on the second ground portion, between the inflection point and a second point at which the target vehicle is located; and
   calculating the ground distance based on the first distance and the second distance.

7. The autonomous driving method of claim 1, wherein the determining of the first slope of the host vehicle and the second slope of the target vehicle comprises either one or both of:
   in response to the host vehicle being located on a first ground portion and the target vehicle being located on a second ground portion, calculating the first slope based on a first front altitude of a first front point and a first rear altitude of a first rear point spaced apart at defined distances from a first point at which the host vehicle is located, and a distance between the first front point and the first rear point, on the first ground portion; and in response to the host vehicle being located on the first ground portion and the target vehicle being located on the second ground portion, calculating the second slope based on a second front altitude of a second front point and a second rear altitude of a second rear point spaced apart at defined distances from a second point at which the target vehicle is located, and a distance between the second front point and the second rear point, on the second ground portion.

8. The autonomous driving method of claim 1, wherein the determining of the first slope of the host vehicle and the second slope of the target vehicle comprises:
determining the first slope using a sensor of the host vehicle;
calculating a slope difference between the host vehicle and the target vehicle based on the first slope and an image of the target vehicle; and
calculating the second slope based on the slope difference.

9. The autonomous driving method of claim 1, wherein the determining of the first slope of the host vehicle and the second slope of the target vehicle comprises:
acquiring a vehicle image corresponding to a defined slope;
calculating a slope difference from the defined slope by comparing an image of the target vehicle to the vehicle image; and
calculating the second slope based on the slope difference.

10. The autonomous driving method of claim 1, wherein the determining of the first slope of the host vehicle and the second slope of the target vehicle comprises:
acquiring a three-dimensional (3D) vehicle image corresponding to a defined slope;
calculating a slope difference from the defined slope by comparing an image of the target vehicle acquired using a stereo camera to the 3D vehicle image; and
calculating the second slope based on the slope difference.

11. The autonomous driving method of claim 1, wherein the controlling of the host vehicle comprises:
determining a risk of the target vehicle based on the corrected result of the recognizing of the target vehicle;
adjusting a speed of the host vehicle based on the risk; and
changing lanes of the host vehicle based on the risk and a lane of the target vehicle.

12. A non-transitory computer-readable storage medium storing instructions that, when executed by a processor, cause the processor to perform the method of claim 1.

13. An autonomous driving method, comprising:
determining a first slope at which a host vehicle is traveling and a second slope of a front road portion on which the host vehicle is to be driven, the second slope being different from the first slope;
predicting a blind spot generated by the first slope and the second slope being different from each other; and
controlling the host vehicle based on the blind spot.

14. The autonomous driving method of claim 13, wherein the predicting of the blind spot comprises determining the blind spot to be a space out of a longitudinal angle of view of a camera, based on a height of the camera from a ground on which the host vehicle is located, the longitudinal angle of view of the camera, and a difference between the first slope and the second slope.

15. The autonomous driving method of claim 13, wherein the controlling of the host vehicle comprises reducing a speed of the host vehicle in response to a distance between the host vehicle and the blind spot being less than a defined distance.

16. The autonomous driving method of claim 13, wherein the controlling of the host vehicle comprises reducing a sensing interval of a sensor of the host vehicle in response to a distance between the host vehicle and the blind spot being less than a defined distance.

17. The autonomous driving method of claim 14, wherein the controlling of the host vehicle comprises:
predicting a path of a target vehicle in the blind spot in response to the target vehicle being located between the host vehicle and the blind spot; and
controlling the host vehicle based on the predicted path of the target vehicle in response to the target vehicle being out of the longitudinal angle of view.

18. An autonomous driving apparatus, comprising: a processor configured to
recognize a target vehicle;
determine a first slope at which a host vehicle is traveling and a second slope at which the target vehicle is traveling, the second slope being different from the first slope;
correct a result of the recognizing of the target vehicle based on a difference between the first slope and the second slope; and
control the host vehicle based on the corrected result of the recognizing of the target vehicle.

19. The autonomous driving apparatus of claim 18, wherein the processor is further configured to recognize any one or any combination of any two or more of:
a distance between the host vehicle and the target vehicle;
a speed of the target vehicle relative to the host vehicle; and
a shape of the target vehicle.

20. The autonomous driving apparatus of claim 18, wherein the processor is further configured to determine a third slope of a front road portion on which the host vehicle is to be driven, predict a blind spot based on the first slope and the third slope, and control the host vehicle based on the blind spot.

21. An autonomous vehicle, comprising:
a processor configured to
determine a first slope at which the autonomous vehicle and a second slope of a front road portion on which the autonomous vehicle is to be driven, the second slope being different from the first slope,
predict a blind spot generated by the first slope and the second slope being different from each other, and
control driving of the autonomous vehicle based on the blind spot.

22. The autonomous vehicle of claim 21, wherein the processor is further configured to predict the blind spot by determining the blind spot to be a space out of a longitudinal angle of view of a camera.

23. The autonomous vehicle of claim 22, wherein the processor is further configured to determine the blind spot to be the space out of the longitudinal angle of view of the camera based on a height of the camera from a ground on which the autonomous vehicle is located, the longitudinal angle of view of the camera, and a difference between the first slope and the second slope.

24. The autonomous vehicle of claim 21, wherein the controlling of the driving of the autonomous vehicle comprises any one or any combination of any two or more of increasing of a reaction speed of the autonomous vehicle, reducing of a travelling speed of the autonomous vehicle, and reducing a sensing interval of a sensor of the autonomous vehicle, in response to determining that the autonomous vehicle is entering the blind spot.

25. The autonomous vehicle of claim 21, further comprising a memory storing instructions that, when executed by the processor, cause the processor to perform the determining, the predicting, and the controlling.

26. The autonomous vehicle of claim 21, wherein the autonomous vehicle is one of an automobile, a motorcycle and a drone.

* * * * *